Patented June 3, 1941

2,244,295

UNITED STATES PATENT OFFICE 2,244,295

STABILIZING CELLULOSE ESTER

Merle A. Heath, Rosecliff, and Ferdinand Schulze, Waynesboro, Va., assignors to E. I. du Pont de Nemours & Company, Wilmington, Del., a corporation of Delaware No Drawing. Application March 7, 1940,
Serial No. 322,764

4 Claims. (Cl. 260—230)

The present invention relates to a new and improved process for the production of cellulose acetate, and other organic acid esters of cellulose, which will be exceedingly stable and suitable for use in molding powder in compression and injection molding processes.

The invention will be described with specific reference to the production of cellulose acetate, it being understood that it will be equally applicable to the production of other organic acid esters of cellulose.

In the currently used commercial manufacturing processes, it is customary to acetylate cellulose with acetic anhydride, in the presence of acetic acid as the solvent and a quantity of sulfuric acid as the catalyst. Sulfuric acid is usually present in the acetylation mixture to the extent of from 3% to 10%, based on the weight of the air-dry cellulose. The resultant cellulose triacetate solution is treated with a quantity of aqueous acetic acid and an additional quantity of sulfuric acid to hydrolyze the product to an acetone-soluble material. As a consequence of the use of sulfuric acid in the production of the cellulose acetate, sulfur-containing radicals, for example, sulfate radicals remain as an integral part of the final product. The amount of sulfate combined with the cellulose acetate may be only from 0.03% to 0.07% (calculated as $H_2SO_4$), but in spite of its relatively minute concentration, it has far-reaching detrimental effects on the physical and chemical properties of the cellulose acetate. It is well known, for example, that the stability to heat of cellulose acetate is seriously diminished by the presence of a small amount of combined sulfates. Combined sulfates also influence the stability of the cellulose acetate to hydrolysis by water. Instability of cellulose acetate to heat is manifested by darkening and embrittlement of manufactured articles such as molded plastics or film. Instability to hydrolysis causes embrittlement of the manufactured articles, and in photographic film base it has a serious effect on the photographic emulsion.

It has been determined that the combined sulfate in cellulose acetate is in the form of a half ester of sulfuric acid. When cellulose acetate containing the combined sulfate is washed with hard water, metal cations displace the hydrogen of the sulfate half ester, that is, the sulfate half ester becomes neutralized with cations such as calcium or magnesium which are normally present in hard water. As a result of this neutralization, the stability of cellulose acetate to heat and hydrolysis is greatly improved and for that reason it has in the past been considered necessary and desirable to wash cellulose acetate with hard water, or to actually add additional mildly alkaline agents such as sodium bicarbonate, calcium carbonate or magnesium carbonate to the mixture during washing. This method of stabilization produces a product that is satisfactory for many industrial uses.

In the development of cellulose acetate for molding powder, it was at first assumed that the discoloration of cellulose acetate compositions during molding was caused by the presence of combined sulfate half esters and could be eliminated by the neutralization of the sulfate half esters with calcareous matter. It has now been found, however, that in the presence of an excess quantity of calcareous matter in cellulose acetate, the discoloration actually becomes worse. It has furthermore been found that discoloration of cellulose acetate compositions during molding can be minimized by reducing, or eliminating, this excess quantity of calcareous mineral matter.

The discoloration of molding powder is found to be a two-stage phenomenon. The presence of calcium, magnesium, or sodium salts causes discoloration to a yellow or light brown color at relatively low temperatures, for example from 150° to 200° C. At higher temperatures, for example from 200° to 300° C., another type of discoloration sets in which is caused by combined sulfate in the cellulose acetate. It appears that low temperature discoloration of cellulose acetate molding powders is caused by substances having an alkaline reaction, whereas high temperature discoloration is caused by substances having an acid reaction.

Cellulose acetate molding powders are employed for both compression and injection molding. It is, therefore, customary to test samples of molding powder for stability by making test molded pieces by both compression and injection methods. Because compression molding is usually carried out at a lower temperature than injection molding, the former will indicate whether or not the cellulose acetate is contaminated with calcareous mineral matter, while the latter test will indicate the presence or absence of objectionable amounts of combined sulfate.

From the above discussion, it is apparent that to be satisfactory for use in molding powder, cellulose acetate must contain a minimum of combined sulfate, must be substantially free from salts having an alkaline reaction and, of course, free from undesirable coloring matters and organic or inorganic impurities that might affect its clarity. If a very small amount of combined sulfate does exist in the cellulose acetate, it should preferably be neutralized with a cation such as calcium or magnesium, without incorporating in the cellulose acetate a material excess of alkaline reacting salts.

In cellulose acetylation processes used heretofore wherein sulfuric acid is used as the acetylation catalyst, the quantity of sulfuric acid used varied between 3% and 10%, based on the weight of the air-dry cellulose involved. It has been considered advisable to use the catalyst to this extent in order that the acetylation proceed rapidly and uniformly. It has also been considered advisable to add an additional amount of sulfuric acid for hydrolysis or saponification, which is as much as, and frequently more than that added to effect acetylation. It is, of course, not surprising that the cellulose acetate so produced contained a very material quantity of combined sulfate.

It is an object of this invention to produce a cellulose acetate, containing a minimum of combined sulfate, and which is uniform in its composition and of such high quality that it is suitable for use in molding powder.

This object is attained by acetylating cellulose in glacial acetic acid as the solvent and in the presence of sulfuric acid as the catalyst, which sulfuric acid is present in sufficient amount to carry out the acetylation but in no case exceeds 2% of the weight of the air-dry cellulose entering the reaction and the total amount of sulfuric acid used is added relatively early in the cycle to effect acetylation and no additional amount of sulfuric acid or other catalyst is added to the cellulose acetate undergoing hydrolysis.

The following examples are given to illustrate preferred methods of carrying out this invention:

*Example I*

One hundred parts of air-dry cotton cellulose are treated with 620 parts glacial acetic acid. After mixing for 45 minutes, there is added a quantity of acetic anhydride molecularly equal to the quantity of water present in the mixture, and an additional quantity of 7½ parts of acetic anhydride. Fifteen minutes later there is added a solution containing 175 parts of glacial acetic acid, 7½ parts of acetic anhydride, and 1.6 parts of sulfuric acid. In this mixture, the sulfuric acid has been converted into acetyl sulfuric acid by reaction with acetic anhydride. (This mixture in preference to one containing no acetic anhydride is used, because it has been found that acetyl sulfuric acid produces cellulose acetate of somewhat lower combined sulfate content and, therefore, of better stability.) The temperature of the mixture rises somewhat after the addition of the catalyst, but is maintained at or below 26° C. by means of cooling water. After 3½ hours total time, the temperature has been brought back to 20° C. and 27½ parts acetic anhydride are then added and one hour later an additional 210 parts acetic anhydride are added. The temperature is then allowed to rise to about 55° C. and when acetylation is completed, as is evidenced by complete solution, 210 parts of 60% acetic acid are added. The temperature of the solution is raised to 60°-65° C. and about two hours later another portion of 210 parts of 60% acetic acid is added. The mixture is saponified at a temperature between 60° C. and 65° C. for ten to fifteen hours, or until the combined acetic acid of the cellulose acetate is reduced to about 56.5%. When this point is reached, 750 pounds of 18% acetic acid preheated to 65° C. are added to the mixture, and the mixture held at 65° C. for an additional period of approximately ten hours, at the end of which time the combined acetic acid has dropped to between 54% and 55%. The solution is then filtered and precipitated in 2500 parts of water. The precipitated cellulose acetate is subsequently washed free of acetic acid in the usual manner, using either mineral-free water or hard water. The cellulose acetate so prepared contains between 0.01% and 0.015% combined sulfate (calculated as $H_2SO_4$).

*Example II*

Air-dry cotton cellulose is acetylated according to the procedure outlined in Example I, except that 1.3 parts of sulfuric acid are used instead of 1.6 parts, and it is added as an acetic acid-sulfuric acid mixture; i. e., the sulfuric acid has not been reacted with acetic anhydride as in Example I. Saponification is conducted as described under Example I.

*Example III*

Cellulose triacetate prepared according to Example I or Example II is saponified without the addition of any 18% acetic acid, and at a temperature between 50° C. and 55° C. When the combined acetic acid content of the cellulose acetate in the mixture has reached 57%–58%, the solution is filtered and precipitated in 2500 pounds of water.

Since the cellulose acetates prepared according to the examples given above contain relatively little combined sulfate, it being generally not greater than 0.01% (calculated as $H_2SO_4$), the cellulose acetates are especially suitable for use in molding powder. In case the cellulose acetate is to be used in molding powder, the combined sulfate must not be left free, but must be neutralized and blocked with a cation such as magnesium without, however, having any excess magnesium salts or other free mineral salts remaining in the cellulose acetate mass. This neutralization of the sulfate half esters may be accomplished in two ways. The precipitated cellulose acetate may be washed with demineralized or distilled water until free of acetic acid, and then further treated with water containing a small predetermined amount of calcium or magnesium salts, such as magnesium carbonate or magnesium acetate. As an alternative, the cellulose acetate is first washed with hard water containing, for example, from 80 to 100 parts per million of hardness expressed as calcium carbonate, or with water to which has been added an alkaline salt such as magnesium carbonate, until the acetic acid has been eliminated or the alkalinity of the effluent wash water is the same as that of the influent water. By this treatment, the half esters of sulfuric acid are neutralized with the magnesium or calcium cation and there will exist additionally a small amount of occluded magnesium or calcium salts. The cellulose acetate is next washed with demineralized water or distilled water until the excess mineral matter derived from the hard water washing has been eliminated.

If it is desired that the cellulose acetate contain still less combined sulfate, it may be washed acid-free with mineral-free water, such as demineralized or distilled water, and then subjected to a steam treatment at about 60 pounds pressure in a digester and for a suitable period of time until the sulfate groups have been hydrolyzed off. If this process is carried out on substantially neutral cellulose acetate; i. e., cellulose acetate which has been washed so that less than 0.1% acetic acid remains in the effluent wash water, this steaming process will not noticeably affect the acetic acid content of the cellulose acetate, but will eliminate substantially completely the combined sulfates. After the steaming step, the cellulose acetate is essentially free of combined sulfate. It requires no neutralization stabilizer and thorough washing with demineralized or distilled water is sufficient to produce a thoroughly stable product.

It is understood, of course, while one of the above stabilizing treatments or some equivalent treatment is essential for the production of the cellulose acetate for use in molding powder, if the cellulose acetate is to be used for many other purposes, this degree of stabilization or removal of combined sulfate is not at all necessary. In this case, the cellulose acetate need only be washed with ordinary hard water, as has been common practice heretofore. Whether the cellulose acetate is treated with hard water only or in accordance with any of the other washing procedures mentioned above, it may, of course, be bleached if desired, for instance with a dilute solution of potassium permanganate, followed by discharge with a weak oxalic acid solution and further washing.

The term "mineral-free water" as used throughout the specification refers to water having no more than 10 parts of mineral residue, nor more than 0.2 part of alkaline earth metals, per million parts of water, and having a pH value of at least 5. Until recently, distilled water was the only type of water generally suitable for this purpose and this would be far too expensive to be practical. Fortunately, it is now possible to obtain water having a high degree of purity, a pH value above 5, and freedom from mineral salts by quite simple and inexpensive methods. Cations may be removed from the water by percolating it through a bed of water-insoluble resin which contains free acid groups. Cations combine with the acidic resin with the liberation of hydrogen ions. The metallic salts originally present in the water are thus converted to the corresponding acids. The effluent from the cation-accepting unit is then passed through a basic resin containing amino groups which combine with the acid present in the water with the result that the effluent from the two combined units is virtually free of mineral matter. The two units can be regenerated after they are exhausted by treating them respectively with solutions of strong mineral acid and strong alkali. The water obtained from a softening system of this type may be further purified by percolating it through a bed of activated carbon to remove organic coloring matter.

The results obtained when water is softened in a system such as just described is shown by the following typical analyses. All the tabulated figures are expressed in parts per million.

| | Influent raw water | Effluent from cation acceptor | Effluent from anion acceptor |
| --- | --- | --- | --- |
| Total residue | 72 | 9.0 | 8.0 |
| Loss on ignition | 15 | 1.0 | 1.0 |
| Fixed residue | 57 | 8.0 | 7.0 |
| Alkalinity | 61 | <2.0 | <2.0 |
| Sulfates | 2 | 2 | 0.1 |
| Soap hardness | 46 | 0 | 0 |

Since it is obvious that many changes and modifications can be made in the details above described without departing from the nature and spirit of the invention, it is to be understood that the invention is not to be limited to these details except as set forth in the appended claims.

We claim:

1. The process of producing highly stable organic acid esters of cellulose which comprises esterifying cellulose in the presence of sulfuric acid as the esterification catalyst, said catalyst being present in an amount sufficient to catalyze the esterification reaction but not in excess of 2%, based on the weight of the cellulose, and hydrolyzing the resulting cellulose ester in the presence of only that amount of sulfuric acid remaining in the mass from the esterification, said amount of acid constituting the whole amount of mineral acid present.

2. The process of producing highly stable organic acid esters of cellulose which comprises esterifying cellulose in the presence of sulfuric acid as the esterification catalyst, said catalyst being present in an amount sufficient to catalyze the esterification reaction but not in excess of 2%, based on the weight of the cellulose, hydrolyzing the resulting cellulose ester in the presence of only that amount of sulfuric acid remaining in the mass from the esterification, and neutralizing any sulfate radical present in the cellulose ester with a cation in aqueous solution, said cation being selected from the group consisting of alkali metal and alkaline earth metal cations.

3. The process of producing highly stable cellulose acetate which comprises acetylating cellulose in the presence of sulfuric acid as the acetylating catalyst, said catalyst being present in an amount sufficient to catalyze the acetylation reaction but not in excess of 2%, based on the weight of the cellulose, and hydrolyzing the resulting cellulose acetate in the presence of only that amount of sulfuric acid remaining in the mass from the acetylation, said amount of acid constituting the whole amount of mineral acid present.

4. The process of producing highly stable cellulose acetate which comprises acetylating cellulose in the presence of sulfuric acid as the acetylating catalyst, said catalyst being present in an amount sufficient to catalyze the acetylation reaction but not in excess of 2%, based on the weight of the cellulose, hydrolyzing the resulting cellulose acetate in the presence of only that amount of sulfuric acid remaining in the mass from the acetylation, and neutralizing any sulfate radical present in the cellulose acetate with a cation in aqueous solution, said cation being selected from the group consisting of alkali metal and alkaline earth metal cations.

MERLE A. HEATH.
FERDINAND SCHULZE.